United States Patent Office 3,357,240
Patented Dec. 12, 1967

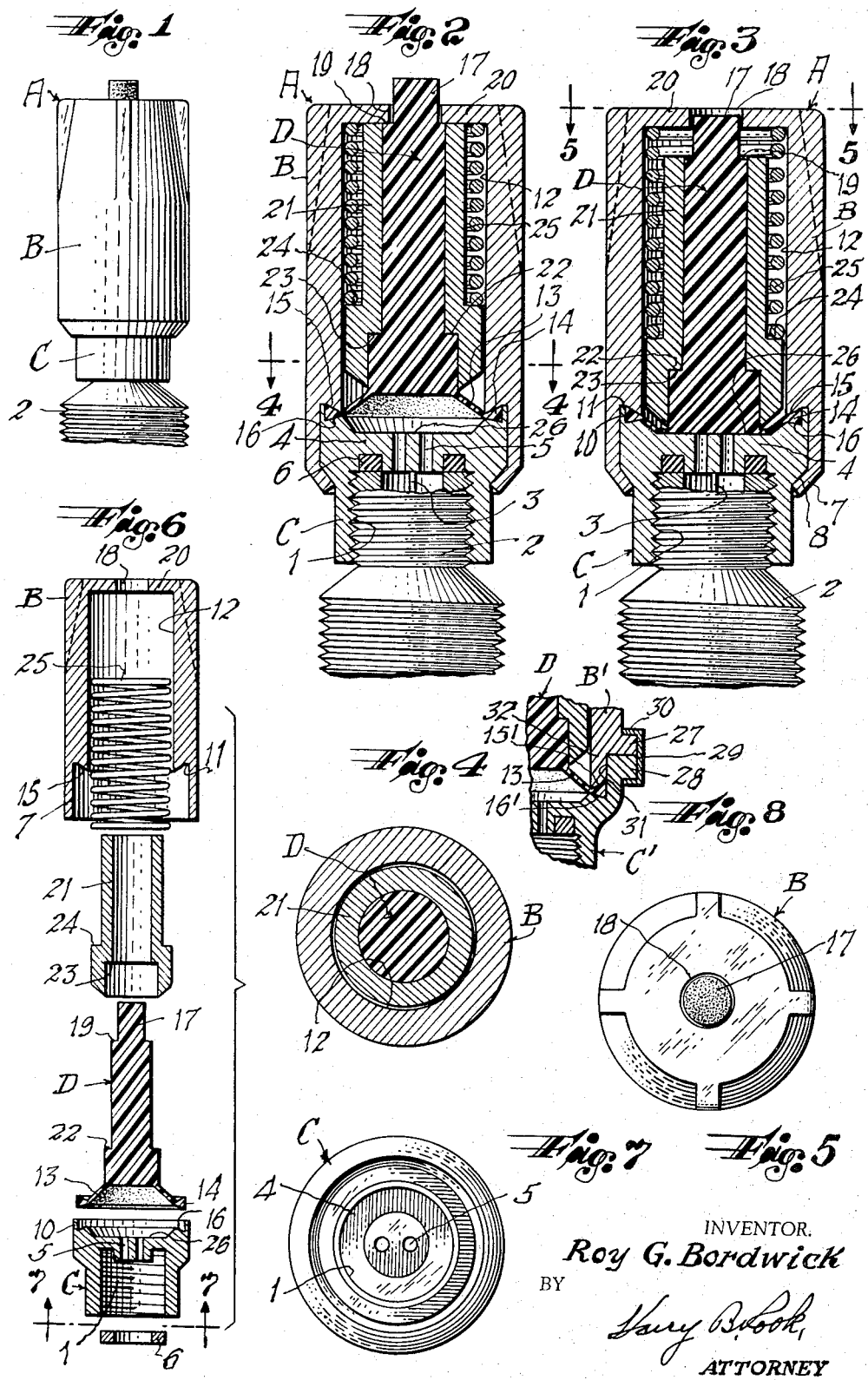

3,357,240
PRESSURE INDICATOR
Roy G. Bordwick, Piscataway, N.J., assignor to Engler
Instrument Company, Jersey City, N.J., a corporation
of New Jersey
Filed Dec. 27, 1966, Ser. No. 604,959
1 Claim. (Cl. 73—146.8)

ABSTRACT OF THE DISCLOSURE

A pressure indicator for connection to a tire valve has a spring biased indicator rod molded integrally with a flexible flange whose edges are clamped between the sections of the indicator casing to form a steel between the sections. One of the sections has a gas inlet passage at the flanged end of the rod, and there is a gradual response of the flange to gas pressure. A rigid sleeve is fitted over said rod and loosely slides in the casing with one end to back up the flange and the other end to abut one end of the casing for limiting movement of the rod and stretching of the flange under the influence of gas pressure especially when subjected to shock pressures such as occur when a tire hits a chuck hole.

Background of invention

The pressure indicator is of the type comprising a casing in which is reciprocable an indicator rod to extend partially out of a casing under the air pressure within the automobile tire or other container and against a compression spring.

Patents No. 2,948,256, No. 2,738,752 and No. 2,795,204 are examples of the prior art devices. In indicators like that of No. 2,795,204 a metal diaphragm is movable with a snap action between two positions in which the indicating pin that simply abuts the diaphragm is moved outwardly of the casing and inwardly of the casing, respectively. Indicators like No. 2,948,256 rely upon a piston slidable in a cylinder with a separate packing ring to prevent the escape of air between the cylinder walls and the piston. No. 2,738,752 shows a resilient diaphragm that actuates in a cylinder in a casing, a separate piston which carries the indicator rod.

Summary

The indicator embodying the invention provides a gradual movement, as contrasted to a snap action, of the indicator rod in both directions, and the integral molding of the indicator rod with a flexible flange responsive to gas pressure entering the casing through one of two casing parts one of which has a gas inlet passage and the flange also provides a sealing member between the casing and the indicator rod as well as a stroke limiting stop for the indicator rod, all in a single or unitary part. The invention also contemplates a novel combination of a rigid sleeve on the indicator rod with one end to back up the flexible flange so as to limit excessive stretching and blow-out of the flange especially when the flange is subjected to shock pressures.

Brief description of the drawing

Referring to the accompanying drawings, FIGURE 1 is a side elevation of a pressure indicator embodying the invention and attached to a casing such as a tire valve casing that is fragmentarily shown;

FIGURE 2 is a central vertical sectional view on an enlarged scale of the indicator on the casing illustrating the indicator rod forced outwardly of the casing under the influence of air pressure;

FIGURE 3 is a similar view showing the indicator rod in normal position or when the pressure in the casing or tire is below a predetermined normal pressure;

FIGURE 4 is a horizontal sectional view on the plane of the line 4—4 of FIGURE 2;

FIGURE 5 is a top plan view from the plane of the line 5—5 of FIGURE 3;

FIGURE 6 is an exploded sectional view showing the parts of the indicator in disassembled relation;

FIGURE 7 is a bottom plan view on an enlarged scale of one of the casing sections viewed from the plane of the line 7—7 of FIGURE 6, and FIGURE 8 is a fragmentary sectional view showing another form of connection of the two casing sections.

Description of the preferred embodiment

Specifically describing the embodiment of the invention illustrated in FIGURES 1 through 7, the pressure gauge includes a casing A which comprises the two sections B and C each having one end connected to one end of the other to provide a chamber. One of the sections, in the present instance section C, is formed at its other end for connection to a container of gas under pressure, and said section is shown as provided with internal threads 1 for separable connection to a casing 2 of a tire valve which has the usual valve stem 3. There is one end wall 4 of the casing section C formed to abut the valve stem 3 to hold the valve in open position in known manner, and there are apertures 5 in said end wall to permit the flow of air therethrough into the chamber formed by the sections. A suitable gasket 6 seated in the wall 4 provides an air tight joint between the valve casing 2 and the section C.

The other casing section A has a coaxial flange 7 which is initially in the form indicated by broken lines in FIGURE 2 and receives the section C with a press fit for connecting the sections in end to end relation, after which the flange is turned inwardly beneath a shoulder 8 on the section C as shown in the drawings so as to firmly connect the sections together, the insertion of the section C into the flange 7 being limited by the abutment of a flange 10 on the end of the section C with the bottom of a recess 11 at the base of the flange 7.

As above stated, the casing has a chamber denoted 12, within which is reciprocable an indicator rod D that is preferably molded of a resilient and flexible material such as a synthetic resin or rubber, preferably the latter; and the indicator rod has molded integrally therewith a circular flexible flange 13 which has a thick rim 14 clamped between undercut seats 15 and 16 on the juxtaposed ends of the casing sections B and C respectively. The flange 13 thus serves as a sealing membrane between the casing sections and between the end of the indicator rod and the casing, and preferably it is initially molded in the form shown in FIGURE 2 being flared outwardly from and beyond the end of the rod, which is the form assumed by the flange when it is subjected to air pressure from the tire or other container. The flange also serves as a sealing ring or gasket to prevent leakage of air between the casing sections.

The end of the indicator rod opposite the flange 13 has a reduced portion 17 which is slidable through a hole 18 in the end of the casing section B opposite the section C to indicate the pressure in the container, and normally outward movement of the rod through said opening under the influence of said pressure is limited by a circular shoulder 19 on the rod that abuts the inner side of the end wall 20 of the casing as shown in FIGURE 2. However, a more positive stop and also a reenforcement for the rod D are provided by a rigid sleeve 21 that fits telescopically over the rod and has an internal shoulder 22 which abuts a shoulder 23 on the rod intermediate the length of the rod, one end of the sleeve being disposed adjacent the juncture of the flange with the rod. The sleeve also has an exterior ledge 24 between which and the end wall 20 of the casing section is interposed a compression spring 25 which normally urges the indicator rod and flange 13 against the influence of air pressure from the container so that when the air pressure is less than the compression strength of the spring, the indicator rod and flange are biased into their normal position abutting a surface 26 on the end of the section C as shown in FIGURE 3. When the indicator rod is in this position, the indicating extension 17 thereof is preferably concealed below the outer surface of the wall 20 of the casing section B as shown in FIGURE 3.

It will be understood from the foregoing that springs of different compression strength will be selected, depending upon the pressure of the gas in the container. It is an important feature of the invention that, for example, a spring might be selected which would cause the indicating tip 17 to remain at its innermost position during pressure variations from 0 to 26 p.s.i. and which as the pressure increased from 26 to 30 p.s.i. would allow the indicator rod gradually to be pushed outwardly of the opening 18 until abutment of the shoulder 19 with the wall 20, the extent of projection of the tip 17 indicating the pressure. The invention also provides against a "blow-out" of the indicator rod even under extreme shock pressures such as occurs when a tire hits a chuck hole, in that the sleeve 21 is made of such length between its extremity and the shoulders 22, 23, that its outer end will abut the wall 20 when a predetermined maximum pressure is exerted on the rod and flange 13 and thereby prevent further movement of the rod. It should be noted also that the end of the rod reenforces the central portion of the flange or sealing membrane 13, and the rod being of resilient, flexible material, acts as a cushion under such extraordinary conditions. The end portion of the sleeve adjacent the flange has a loosely slidable relation to the walls of the chamber 12 and the end surface of the sleeve is abutted by and serves as a back up for the flange so as to limit sudden expansion and blowout of the flexible flange under excessive pressure.

It is desirable that the casing sections be so connected that they cannot be disassembled and the operation or calibration of the gauge cannot be tampered with. Other forms of connection between the casing sections than that shown in FIGURES 1, 2 and 3 can be utilized, and another type of connection is shown in FIGURE 8 of the drawings wherein the abutting ends of the casing sections B' and C' are formed with the respective circumferential flanges 27 and 28 which abut each other and are permanently clamped together by a clamping ring 29 that encircles the flanges and has its edge portions 30 bent inwardly over the flanges 27 and 28. With this form of connection, preferably the section C' has an internal cylindrical surface 31 outwardly of the seat 16' corresponding to the seat 16 and the section B' has an extension 32 beyond the flange 27 which is telescopically associated with the surface 31 and has at the end thereof the seat 15' corresponding to the seat 15 of the construction shown in FIGURES 2 and 3. The flanges 27, 28 and the ring 29 are of such diameter as to prevent the gauge from being pulled through the valve stem hole in a wheel rim when the tire is deflated.

I claim:

A pressure indicator comprising a casing having a first section and a second section each having one end connected to one end of the other and providing a chamber between them, the other end of the first section having a central opening leading outwardly from said chamber, the second section having its other end formed for connection to a pressure container and being provided with a passage for gas under pressure from said container into said chamber, an indicator rod formed of resilient material and having attached to one end thereof a flexible and elastic sealing flange, said flange having a circumferential rim portion clamped between the first-mentioned ends of said casing sections, said indicator rod being reciprocable in said chamber with the opposite end of the rod slidable in and extendable outwardly through said opening in the first casing section and being actuated in one direction by gas under pressure entering said casing through said passage, said indicator rod having a shoulder intermediate its ends, a rigid sleeve telescopically mounted on said rod and having an interior shoulder abutting said shoulder on the rod and also having an exterior ledge, one end of said sleeve being disposed closely adjacent the juncture of said flange and the rod to be abutted by said flange upon expansion of the flange under gas pressure in excess of a predetermined maximum pressure and the length of said sleeve providing for abutment of the other end of the sleeve with said other end of the first casing section upon such expansion of the flange, the portion of said sleeve between the first mentioned end and said ledge having a loosely slidable contact with the walls of said chamber, thereby to limit movement of the indicator rod outwardly of the casing under influence of the gas pressure and at the same time to positively limit stretching of the flange for preventing bursting or blow-out of the flange under shock pressures, and a compression spring of predetermined strength interposed between said ledge and the second-mentioned end of the first casing section normally biasing said indicator rod toward the first-mentioned end of the second casing section.

References Cited

UNITED STATES PATENTS

| | | | |
|---|---|---|---|
| 2,795,204 | 6/1957 | Rose | 116—34 |
| 3,203,246 | 8/1965 | Horwitt et al. | 116—70 |

LOUIS R. PRINCE, *Primary Examiner.*

D. E. CORR, *Assistant Examiner.*